US009058791B2

(12) United States Patent
Jiang et al.

(10) Patent No.: US 9,058,791 B2
(45) Date of Patent: Jun. 16, 2015

(54) IMAGE PROCESSING DEVICE

(71) Applicant: NOVATEK MICROELECTRONICS CORP., Hsinchu (TW)

(72) Inventors: Jian-De Jiang, Xian (CN); Chun Wang, Shanghai (CN)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 161 days.

(21) Appl. No.: 13/742,880

(22) Filed: Jan. 16, 2013

(65) Prior Publication Data

US 2013/0286006 A1 Oct. 31, 2013

(30) Foreign Application Priority Data

Apr. 26, 2012 (CN) .......................... 2012 1 0127408

(51) Int. Cl.
*G06T 15/00* (2011.01)
*G09G 5/391* (2006.01)
*G09G 5/393* (2006.01)

(52) U.S. Cl.
CPC ................ *G09G 5/391* (2013.01); *G09G 5/393* (2013.01); *G09G 2340/0407* (2013.01); *G09G 2340/0435* (2013.01); *G09G 2350/00* (2013.01)

(58) Field of Classification Search
CPC ........... F16H 3/66; F16H 3/72; F16H 47/085; G09G 2340/0407; G09G 2340/0435; G09G 2350/00; G09G 5/391; G09G 5/393
See application file for complete search history.

(56) References Cited

U.S. PATENT DOCUMENTS

2010/0039428 A1* 2/2010 Kim et al. ..................... 345/419
2010/0171817 A1 7/2010 Tourapis et al.
2011/0122227 A1* 5/2011 Kim ................................ 348/43
2013/0114885 A1* 5/2013 Ha ................................ 382/154

FOREIGN PATENT DOCUMENTS

TW I279736 B 4/2007
WO WO 2011-100735 A1 8/2011

OTHER PUBLICATIONS

Chinese Office Action dated Oct. 11, 2014.
Taiwanese Office Action dated Jan. 16, 2015.

* cited by examiner

*Primary Examiner* — Kee M Tung
*Assistant Examiner* — Frank Chen
(74) *Attorney, Agent, or Firm* — Rabin & Berdo, P.C.

(57) ABSTRACT

An image processing device includes an image processing unit, an over-driving unit, and an up-sampler. The image processing unit receives a full-resolution 3D input image and outputs a half-resolution 3D image to a memory. The over-driving unit is coupled to the image processing unit and the memory for over-driving a current half-resolution 3D image outputted from the image processing unit according to a previous half-resolution 3D image stored in the memory. The up-sampler is selectively coupled to the over-driving unit for up-sampling an over-driven half-resolution 3D image outputted from the over-driving unit to output a full-resolution 3D output image.

4 Claims, 3 Drawing Sheets

IMAGE PROCESSING DEVICE

This application claims the benefit of People's Republic of China application Serial No. 201210127408.6, filed Apr. 26, 2012, the subject matter of which is incorporated herein by reference.

BACKGROUND

1. Technical Field

The disclosure relates in general to an image processing device and an image processing method thereof.

2. Description of the Related Art

Currently, three-dimensional (3D) display (such as TV and computer monitor) has become more and more popular. The 3D display can display 3D content as well as two-dimensional (2D) content. Examples of existing 3D image formats include side-by-side (SBS) format, top-and-bottom (TB) format, checkerboard format and line interleaved format.

In a SBS format 3D image, the left-eye (L) image and the right-eye (R) image are displayed side-by-side. The L and R images both have half-resolution in the horizontal direction and full-resolution in the vertical direction. When the L and R images combined together, the combined 3D image has normal resolution. As for a SBS 3D image having a resolution of 1920×1080, the resolutions of the L and R images both are 960×1080.

In a TB format 3D image, the L and R images both have half-resolution in the vertical direction but full-resolution in the horizontal direction. When the L and R images are combined together, the combined 3D image has normal resolution. As for a TB 3D image of 1920×1080, the resolutions of the L and R images both are 1920×540.

In a checkerboard format 3D image, the L and R images are interleaved. That is, if a middle pixel belongs to the left-eye image, then 4 pixels surrounding to the middle pixel belong to the R image. Therefore, in a checkerboard format 3D image, the L and R images both are half-resolution.

In a line interleaved format 3D image, the L and R images are interleaved in the same frame line by line. For example, odd-numbered pixel rows belong to the L image, and even-numbered pixel rows belong to the R image. Therefore, the L and R images both are half-resolution.

In order to support shutter type 3D display, the frame rate or data size for playing 3D images is twice as much as that required for playing 2D images. In order to support 3D image processing and 3D image display, the bandwidth and capacity of the memory inside a 3D TV chip must be increased (to be twice as much as that required for playing 2D images). In addition, power consumption also increases.

SUMMARY OF THE DISCLOSURE

The disclosure is directed to an image processing device and a method thereof, wherein, the output and input images of the memory are half-resolution.

According to one embodiment of the present disclosure, an image processing device and a method thereof are provided. The image processing device supports shutter type 3D display. For the final output display data are full-resolution, the half-resolution 3D image data is up-sampled.

The embodiment of the disclosure relates to an image processing device and a method thereof. The image processing device supports 2D display and shutter type 3D display. When displaying 2D image data, a resolution up-sampled path and a resolution down-sampled path are bypassed so that the output display data is 2D display data.

According to another embodiment of the present disclosure, an image processing device including an image processing unit, an over-driving unit, and an up-sampler is provided. The image processing unit receives a full-resolution 3D input image and outputs a half-resolution 3D image to a memory. The over-driving unit is coupled to the image processing unit and the memory for over-driving a current half-resolution 3D image outputted from the image processing unit according to a previous half-resolution 3D image stored in the memory. The up-sampler is selectively coupled to the over-driving unit for up-sampling an over-driven half-resolution 3D image outputted from the over-driving unit to output a full-resolution 3D output image.

According to another embodiment of the present disclosure, an image processing device including an image processing unit, an up-sampler group, and an over-driving unit is provided. The image processing unit receives a full-resolution 3D input image and outputs a half-resolution 3D image to a memory. The up-sampler group is selectively coupled to the image processing unit and the memory for up-sampling a current half-resolution 3D image outputted from the image processing unit and a previous half-resolution 3D image outputted from the memory, respectively to obtain a current full-resolution 3D image and a previous full-resolution 3D image respectively. The over-driving unit is coupled to the up-sampler group to output a full-resolution 3D output image according to the current and the previous full-resolution 3D images.

According to another embodiment of the present disclosure, an image processing device including an image processing unit, a first up-sampler, an over-driving unit, a down-sampler, and a second up-sampler is provided. The image processing unit receives a full-resolution 3D input image and outputs a current half-resolution 3D image. The first up-sampler is selectively coupled to the image processing unit for up-sampling the current half-resolution 3D image to obtain a current full-resolution 3D image. The over-driving unit is coupled to the first up-sampler for outputting a first full-resolution 3D output image. The down-sampler is selectively coupled to the over-driving unit for down-sampling the first full-resolution 3D output image to obtain a previous half-resolution 3D image and store the previous half-resolution 3D image to a memory. The second up-sampler is selectively coupled to the memory for up-sampling the previous half-resolution 3D image to obtain a previous full-resolution 3D image. The over-driving unit is further coupled to the second up-sampler for outputting a second full-resolution 3D output image according to the current and the previous full-resolution 3D images.

According to another embodiment of the present disclosure, a timing controller used in an image processing device is provided. The timing controller includes an over-driving unit and an up-sampler. The over-driving unit receives a half-resolution 3D image and outputs an over-driven half-resolution 3D image. The up-sampler is selectively coupled to the over-driving unit for up-sampling the over-driven half-resolution 3D image to output a full-resolution 3D output image.

According to another embodiment of the present disclosure, a timing controller used in an image processing device is provided. The timing controller includes an up-sampler group and an over-driving unit. The up-sampler group receives and up-samples a current half-resolution 3D image and a previous half-resolution 3D image to obtain a current full-resolution 3D image and a previous full-resolution 3D image respectively. The over-driving unit is coupled to the up-sampler group for outputting a full-resolution 3D output image according to the current and the previous full-resolution 3D images.

According to another embodiment of the present disclosure, a timing controller used in an image processing device is provided. The timing controller includes a first up-sampler, an over-driving unit, a down-sampler, and a second up-sampler. The first up-sampler receives and up-samples a current half-resolution 3D image to obtain a current full-resolution 3D image. The over-driving unit is coupled to the first up-sampler for outputting a first full-resolution 3D output image. The down-sampler is selectively coupled to the over-driving unit for down-sampling the first full-resolution 3D output image to obtain a previous half-resolution 3D image and store the half-resolution 3D image to a memory. The second up-sampler is selectively coupled to the memory for up-sampling the previous half-resolution 3D image to obtain a previous full-resolution 3D image. The over-driving unit is further coupled to the second up-sampler for outputting a second full-resolution 3D output image according to the current and the previous full-resolution 3D images.

The above and other contents of the disclosure will become better understood with regard to the following detailed description of the preferred but non-limiting embodiment (s). The following description is made with reference to the accompanying drawings.

DETAILED DESCRIPTION OF THE DISCLOSURE 3D broadcasting and most 3D data belong to half-resolution data with such as side-by-side (SBS) format, top-and-bottom (TB) format, checkerboard format and line interleaved format. In the embodiments of the present disclosure, during data processing, data input into/output from the memory are half-resolution. So that, the embodiments of the disclosure support full-resolution 3D display (exemplarily but not restrictively, support shutter type 3D display) without jeopardizing clarity or increasing the bandwidth and capacity of the memory or incurring more power consumption.

When supporting full-resolution 3D display, the final output display data has full-resolution. Therefore, in the embodiments of the present disclosure, the image data on the data processing path into the final display output is up-sampled, which performs calculation (such as interpolation) on the half-resolution 3D image data for up-sampling 3D image data to full-resolution data.

Figure 1:
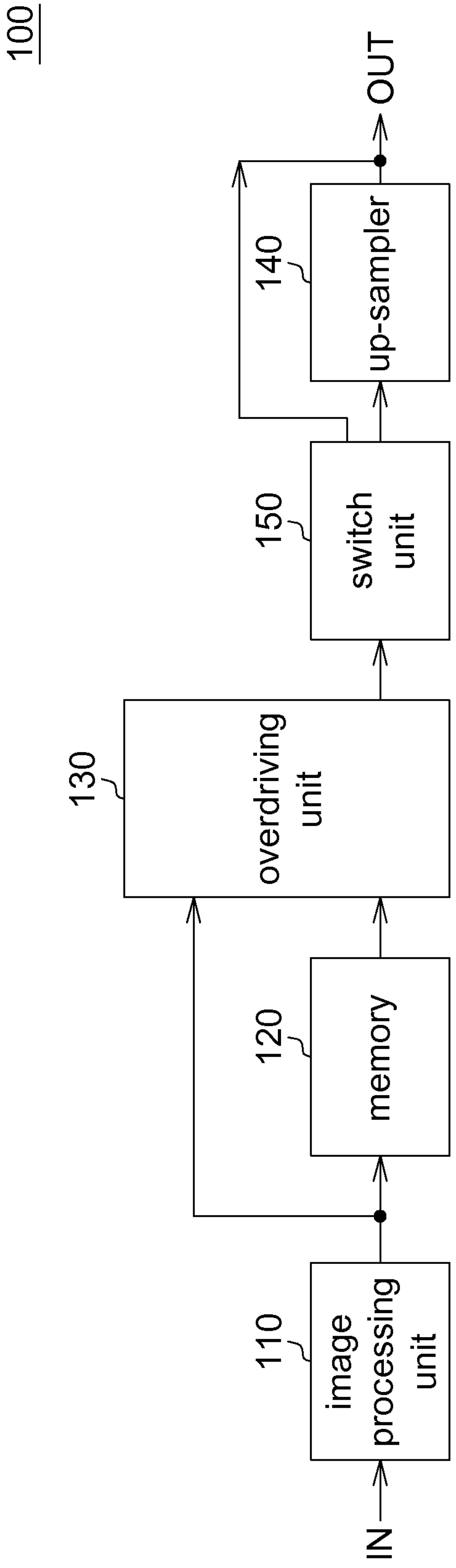
FIG. 1 shows a functional block diagram of an image processing device according to an embodiment of the disclosure.

Referring to FIG. 1, a functional block diagram of an image processing device according to an embodiment of the disclosure is shown. As indicated in FIG. 1, the image processing device 100 at least includes an image processing unit 110, a memory 120, an overdriving unit 130 and an up-sampler 140. In addition, the image processing device 100 further includes a switch unit 150.

The image processing unit 110 receives an input image IN. The image processing unit 110 is realized by a system-on-chip (SOC), but the present disclosure is not limited thereto. The mage data outputted from the image processing unit 110 is based on the input image IN.

If the input image IN is in 2D format, then the image processing unit 110 also outputs 2D format image data. For example, if the resolution of the 2D input image IN is 1920×1080 and the frequency of the 2D input image IN is 50/60 Hz, then the resolution of the output image data of the image processing unit 110 and the frequency of the output image data remain the same, that is, 1920×1080 and 50/60 Hz, and the image format of the output image data is still in 2D image format.

If the input image IN is in full-resolution 3D image format, then the image data outputted from the image processing unit 110 is in half-resolution 3D image format. For example, if the input image IN is SBS 3D data or checkerboard 3D data which has resolution of 1920×1080 and frequency of 50/60 Hz, then the resolution of the 3D output image data of the image processing unit 110 is halved (960×1080), the frequency is increased to 100/120 Hz, and the left-eye (L) image and the right-eye (R) image are interleaved. That is, if the current frame is a left-eye image, then the following frame is an R image.

For example, the input image IN is in 3D TB format or 3D line interleaved format which has the resolution of 1920×1080, and frequency of 50/60 Hz, then the resolution of the 3D output image data of the image processing unit 110 is halved (1920×540), the frequency is increased to 100/120 Hz, and the L and R images are interleaved.

In the present embodiment, when processing a 2D image, the clock frequency of the output data of the image processing unit 110 is equal to 148.5 MHz=(1920+280)×(1080+45)×60 Hz=2200×1125×60 Hz, wherein, 280 is a horizontal blanking parameter. When processing a 3D image, the clock frequency of the output data of the image processing unit 110 is equal to (1920+280)×(540+45)×120 Hz=2200×585×120=154.44 MHz.

The memory 120 is coupled to the image processing unit 110. Exemplarily but not restrictively, the memory 120 is a double data rate (DDR) memory. The bandwidth of the memory 120 is associated with the output data rate of the image processing unit 110, and the required capacity of the memory 120 is associated with the resolution of the received image data. The output data rate of the image processing unit 110 basically remains the same no matter the received image data is 2D or 3D. In the present embodiment, the required bandwidth of the memory 120 for receiving 2D or 3D input image IN has very little difference. Since the 3D image data is half-resolution and the 2D image data is full-resolution, the capacity of the memory 120 required for storing 3D image data is about a half of that required for storing 2D image data. Therefore, the present embodiment effectively controls the bandwidth and/or capacity of the memory 120 required for storing 3D image data.

The over-driving unit 130 receives image data outputted from the image processing unit 110 and image data stored in the memory 120. Furthermore, the over-driving unit 130 over-drives a current half-resolution 3D image outputted from the image processing unit 110 according to a previous half-resolution 3D image stored in the memory 120. Details of the over-driving are not repeated here. In the present embodiment, the over-driving unit 130 is such as disposed inside the timing controller, the memory 120 is such as disposed inside or outside the timing controller, and these exemplifications are all within the spirit of the disclosure.

The switch unit 150 is coupled between the over-driving unit 130 and the up-sampler 140. Furthermore, the switch unit 150 guides the image data outputted from the over-driving unit 130 to the up-sampler 140 if the image data outputted from the over-driving unit 130 is 3D. The switch unit 150 guides the image data outputted from the over-driving unit 130 to the last output stage OUT if the image data outputted from the over-driving unit 130 is 2D. In the present embodiment, if the image data is in 2D format, then the 2D image data will bypass the up-sampler 140.

The up-sampler 140 receives the half-resolution 3D image data outputted from the switch unit 150, and further up-samples the resolution of the received image data without changing the data frequency. Or, the up-sampler 140 is selectively coupled to the over-driving unit 130 for up-sampling the over-driven half-resolution 3D image outputted from the over-driving unit 130 to output a full-resolution 3D output image. Furthermore, the up-sampler 140 increases the resolution to 1920×1080 if the half-resolution 3D image data outputted from the switch unit 150 is in 3D SBS or 3D checkerboard format (960×1080 resolution). On the other hand, the up-sampler 140 increases the resolution to 1920×1080 if the half-resolution 3D image data outputted from the switch unit 150 is in 3D TB or 3D line interleaved format (1920×540 resolution). Therefore, the resolution of the image data OUT outputted from the up-sampler 140 is 1920×1080, the frequency of the image data is 100/120 Hz, and the L and R images are interleaved.

Figure 2:
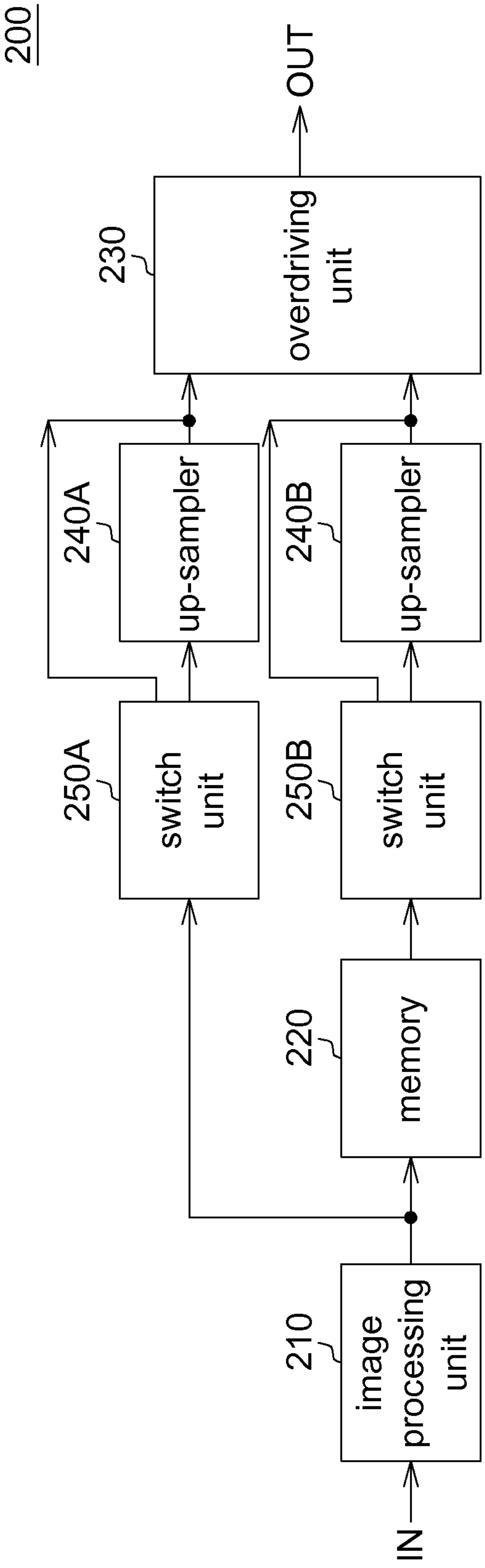
FIG. 2 shows a functional block diagram of an image processing device according to another embodiment of the disclosure.

Referring to FIG. 2, a functional block diagram of an image processing device according to another embodiment of the disclosure. As indicated in FIG. 2, the image processing device 200 at least includes an image processing unit 210, a memory 220, an over-driving unit 230 and two up-samplers 240A and 240B. In addition, the image processing device 200 further includes two switch units 250A and 250B.

The principles and operations of the image processing unit 210, the memory 220, the over-driving unit 230, the up-samplers 240A-240B and the switch units 250A-250B of FIG. 2 are similar or identical to the same or similar components of FIG. 1 except that the image data inputted to the over-driving unit 130 of FIG. 1 is half-resolution but the image data inputted to the over-driving unit 230 of FIG. 2 is full-resolution.

As indicated in FIG. 2, the switch unit 250A is coupled between the image processing unit 210 and the up-sampler 240A, and the switch unit 250B is coupled between the memory 220 and the up-sampler 240B. Furthermore, the switch unit 250A guides the image data outputted from the image processing unit 210 to the up-sampler 240A if the image data outputted from the image processing unit 210 is in 3D format, and the switch unit 250A guides the image data outputted from the image processing unit 210 to the over-driving unit 230 if the image data outputted from the image processing unit 210 is in 2D format. Likewise, the switch unit 250B guides the image data outputted from the memory 220 to the up-sampler 240B if the image data outputted from the memory 220 is in 3D format, and the switch unit 250B guides the image data outputted from the memory 220 to the over-driving unit 230 if the image data outputted from the memory 220 is in 2D format. In the present embodiment, if image data is in 2D format, then the 2D image data will bypass the up-samplers 240A and 240B.

The bandwidth required by the memory 220 basically remains the same no matter the received image data is in 2D or in 3D image format. The capacity of the memory 220 required for storing 3D image data is about a half of that required for storing 2D image data. Therefore, the present embodiment effectively controls the bandwidth and/or capacity of the memory 220 required for storing 3D image data.

To put it in greater details, the up-samplers 240A and 240B are selectively coupled to the image processing unit 210 and the memory 220, for up-sampling a current half-resolution 3D image outputted from the image processing unit 210 and a previous half-resolution 3D image outputted from the memory 220, respectively to obtain a current full-resolution 3D image and a previous full-resolution 3D image respectively.

The over-driving unit 230 is coupled to the up-samplers 240A and 240B for outputting a full-resolution 3D output image OUT according to the current full-resolution 3D image and the previous full-resolution 3D image.

Figure 3:
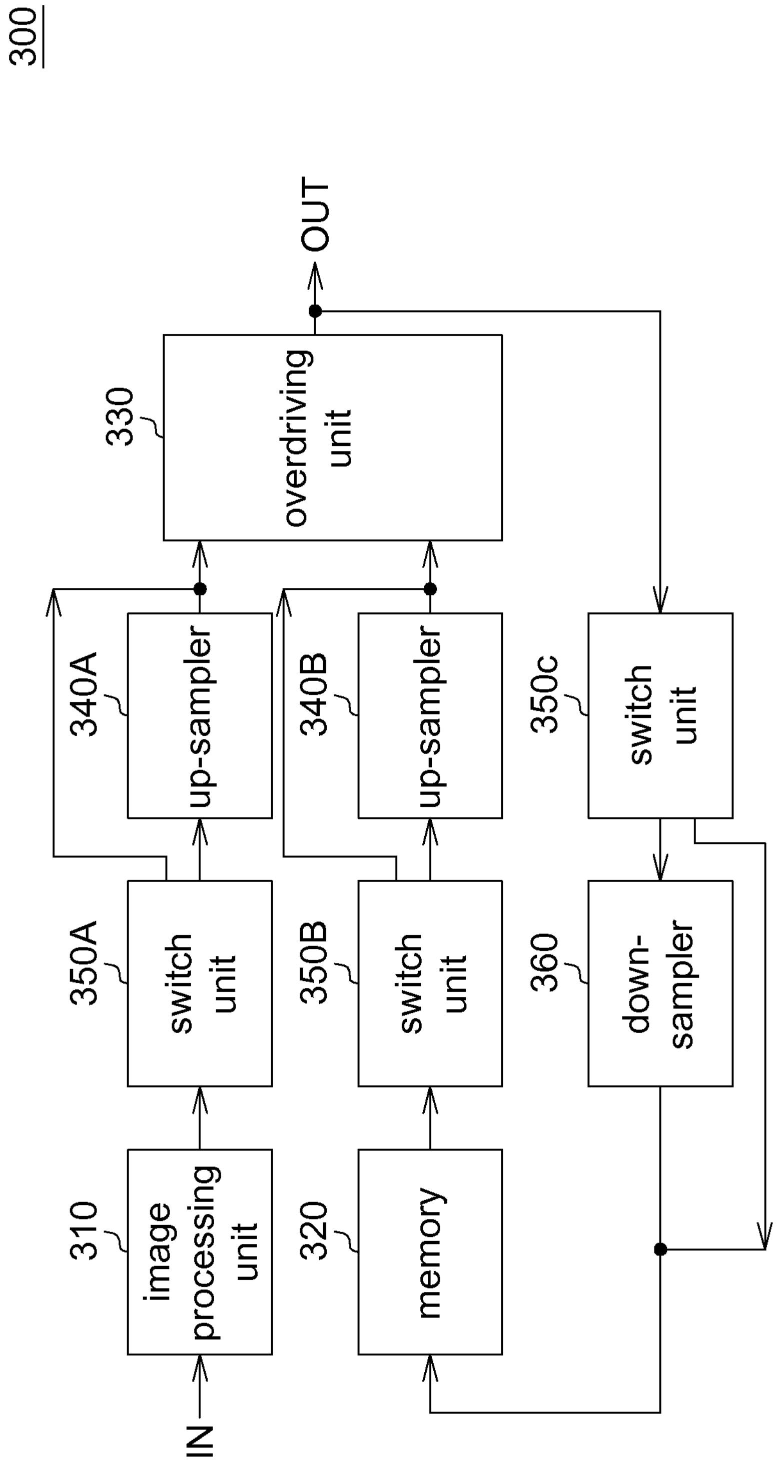
FIG. 3 shows a functional block diagram of an image processing device according to an alternate embodiment of the disclosure.

Referring to FIG. 3, a functional block diagram of an image processing device according to an alternate embodiment of the disclosure. As indicated in FIG. 3, the image processing device 300 at least includes an image processing unit 310, a memory 320, an over-driving unit 330, two up-samplers 340A and 340B and a down-sampler 360. In addition, the image processing device 300 further includes three switch units 350A-350C. The down-sampler 360 down-samples (such as halves) the resolution of the image data but maintains the frequency of the image data.

The principles and operations of the image processing unit 310, the memory 320, the over-driving unit 330, the up-samplers 340A-340B and the switch units 350A-350C of FIG. 3 are similar or identical to that of FIG. 1 except that the image data inputted to the over-driving unit 330 of FIG. 3 is full-resolution.

As indicated in FIG. 3, the switch unit 350A is coupled between the image processing unit 310 and the up-sampler 340A, the switch unit 350B is coupled between the memory 320 and the up-sampler 340B, and the switch unit 350C is coupled between the over-driving unit 330 and the down-sampler 360.

Furthermore, the switch unit 350A guides the image data outputted from the image processing unit 310 to the up-sampler 340A if the image data outputted from the image processing unit 310 is in 3D format, and the switch unit 350A guides the image data outputted from the image processing unit 310 to the over-driving unit 330 if the image data outputted from the image processing unit 310 is in 2D format. Likewise, the switch unit 350B guides the image data outputted from the memory 320 to the up-sampler 340B if the image data outputted from the memory 320 is in 3D format, and the switch unit 350B guides the image data outputted from the memory 320 to the over-driving unit 330 if the image data outputted from the memory 320 is in 2D format. Likewise, the switch unit 350C guides the image data outputted from the over-driving unit 330 to the down-sampler 360 if the image data outputted from the over-driving unit 330 is in 3D format, and the switch unit 350C guides the image data outputted from the over-driving unit 330 to the memory 320 if the image data outputted from the over-driving unit 330 is in 2D format. In the present embodiment, if image data is in 2D format, then the 2D image data will bypass the up-samplers 340A-340B and the down-sampler 360.

To put it in greater details, the up-sampler 340A is selectively coupled to the image processing unit 310 for up-sampling the current half-resolution 3D image outputted from the image processing unit 310 to obtain a current full-resolution 3D image. The over-driving unit 330 is coupled to the first up-sampler for outputting a first full-resolution 3D output image OUT. The down-sampler 360 is selectively coupled to the over-driving unit 330 for down-sampling the first full-resolution 3D output image OUT to obtain a previous half-resolution 3D image and for inputting the previous half-resolution 3D image to the memory 320. The up-sampler 340B is selectively coupled to the memory 320 for up-sampling the previous half-resolution 3D image outputted from the memory 320 to obtain a previous full-resolution 3D image. The previous full-resolution 3D image is inputted to the over-driving unit 330. The over-driving unit 330 outputs a second full-resolution 3D output image according to the current and the previous full-resolution 3D images. Furthermore, the over-driving unit 330 over-drives the current full-resolution 3D image outputted from the up-sampler 340A according to the previous full-resolution 3D image outputted from the up-sampler 340B. Here, "the first full-resolution 3D output image" and "the second full-resolution 3D output image" refer to over-driven full-resolution 3D output images obtained at different timing.

The bandwidth required by the memory 320 basically remains the same no matter the input image IN being in 2D image format or in 3D image format. The capacity of the memory 320 required for storing 3D image data is about a half of that required for storing 2D image data. Therefore, the present embodiment effectively controls the bandwidth and/or capacity of the memory 320 required for storing 3D image data.

In the embodiments of the present disclosure, during data processing, the input and output data of the memory are half-resolution and thus the embodiments support full-resolution 3D display (exemplarily but not restrictively, shutter type 3D display) without jeopardizing clarity or increasing the bandwidth and capacity of the memory or incurring more power consumption. 3D half-resolution image data on the data processing path into the last display output stage is up-sampled and output as a full-resolution data.

In the above embodiments of the disclosure, the over-driving unit, the switch unit and the up-sampler may together be referred as a timing controller.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing device, comprising:

an image processing circuit, for receiving a full-resolution 3D input image and outputting a current half-resolution 3D image;

a first up-sampler selectively coupled to the image processing circuit for up-sampling the current half-resolution 3D image to obtain a current full-resolution 3D image;

an over-driving circuit coupled to the first up-sampler for outputting a first full-resolution 3D output image;

a down-sampler selectively coupled to the over-driving circuit for down-sampling the first full-resolution 3D output image to obtain a previous half-resolution 3D image and input the previous half-resolution 3D image to a memory; and a second up-sampler selectively coupled to the memory for up-sampling the previous half-resolution 3D image to obtain a previous full-resolution 3D image;

wherein, the over-driving circuit is further coupled to the second up-sampler for outputting a second full-resolution 3D output image according to the current and the previous full-resolution 3D images.

2. The image processing device according to claim 1, further comprising:

a switch group for bypassing a 2D image from the first up-sampler, the second up-sampler and the down-sampler.

3. A timing controller used in an image processing device, comprising:

a first up-sampler used for receiving and up-sampling a current half-resolution 3D image to obtain a current full-resolution 3D image;

an over-driving circuit coupled to the first up-sampler for outputting a first full-resolution 3D output image;

a down-sampler selectively coupled to the over-driving circuit for down-sampling the first full-resolution 3D output image to obtain a previous half-resolution 3D image and input the previous half-resolution 3D image to a memory; and a second up-sampler selectively coupled to the memory for up-sampling the previous half-resolution 3D image to obtain a previous full-resolution 3D image;

wherein, the over-driving circuit is further coupled to the second up-sampler to output a second full-resolution 3D output image according to the current and the previous full-resolution 3D images.

4. The timing controller according to claim 3, further comprising:

a switch circuit group for bypassing a 2D image from the first up-sampler, the second up-sampler and the down-sampler.

* * * * *